US008946620B2

(12) United States Patent
Loong et al.

(10) Patent No.: US 8,946,620 B2
(45) Date of Patent: Feb. 3, 2015

(54) PROXIMITY SENSOR DEVICE WITH INTERNAL CHANNELING SECTION

(71) Applicant: Avago Technologies General IP (Singapore) Pte. Ltd., Singapore (SG)

(72) Inventors: John Lim Ngee Loong, Singapore (SG); Kai Koon Lee, Singapore (SG); Wee Sin Tan, Singapore (SG)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 275 days.

(21) Appl. No.: 13/652,940

(22) Filed: Oct. 16, 2012

(65) Prior Publication Data
US 2014/0103199 A1    Apr. 17, 2014

(51) Int. Cl.
*H01J 40/14*    (2006.01)

(52) U.S. Cl.
USPC ........................................... 250/221

(58) Field of Classification Search
USPC ............ 250/221, 222.1, 214.1; 340/686.6; 356/4.01–4.09
See application file for complete search history.

(56) References Cited

U.S. PATENT DOCUMENTS

| 5,142,152 | A | 8/1992 | Boiucaner |
| 7,459,670 | B2 | 12/2008 | Lewin |
| 7,486,386 | B1 | 2/2009 | Holcombe et al. |
| 7,907,061 | B2 | 3/2011 | Lin et al. |
| 8,791,489 | B2 * | 7/2014 | Rudmann et al. ............... 257/98 |
| 2011/0121181 | A1 | 5/2011 | Costello |
| 2013/0264586 | A1 * | 10/2013 | Rudmann et al. ............... 257/81 |
| 2013/0284906 | A1 * | 10/2013 | Rudmann et al. ............. 250/216 |

* cited by examiner

*Primary Examiner* — Seung C Sohn

(57) ABSTRACT

A proximity sensor device, which may detect the presence of external objects at close proximity is disclosed. The proximity sensor device may comprise an emitter, a detector, a separation wall and an internal channeling section. In one embodiment, the internal channeling section may be configured to direct light from the emitter to the detector when the external object is present at close proximity. In other embodiments, a proximity sensor assembly, an optical structure and an electronic device having similar internal channeling section are disclosed.

20 Claims, 12 Drawing Sheets

PROXIMITY SENSOR DEVICE WITH INTERNAL CHANNELING SECTION

BACKGROUND

Proximity sensor devices are commonly used in electronic gear to turn power-consuming circuitries on or off in response to the proximity sensor device detecting something nearby. Use of proximity sensor devices in such applications may be particularly efficient because they may provide for detecting proximity without having to make physical contact. Proximity sensor devices are widely used in mobile phones nowadays. In such applications, proximity sensor devices are configured to turn off the Liquid Crystal Display (referred herein after as "LCD") to prolong battery life when users place their mobile phones near their ears. For smart phones having LCDs with capacitive sensors, the proximity sensor devices may be configured to cut off the capacitive sensors to prevent unintended input due to contact of the skin and the LCD panels.

In some applications such as mobile phones, the proximity sensor devices may also be required to detect the presence of objects located very close to the proximity sensor devices. This may be an issue, as conventional proximity sensor devices are known to be susceptible to blind spot issue at close proximity. For such applications, it may be difficult to use such conventional proximity sensor devices to detect the external object positioned closely.

Proximity sensor devices may be formed as individual single integrated devices or alternatively may be assembled from pre-manufactured components. For example, proximity sensor devices may be assembled from packaged light-emitting devices and packaged detectors. The emitter and the detector may be assembled onto a printed circuit board (referred herein after as PCB) of an electronic device directly. For such proximity sensor assemblies, optical structures may be required to provide optical functionality needed for the proximity sensing. For example, the optical structures may be configured to direct light to a specific direction and not all directions.

BRIEF DESCRIPTION OF THE DRAWINGS

Illustrative embodiments by way of examples, not by way of limitation, are illustrated in the drawings. Throughout the description and drawings, similar reference numbers may be, but not necessary, used to identify similar elements. The drawings are for illustrative purpose to assist understanding and may not be drawn per actual scale.

DETAILED DESCRIPTION

Figure 1A:
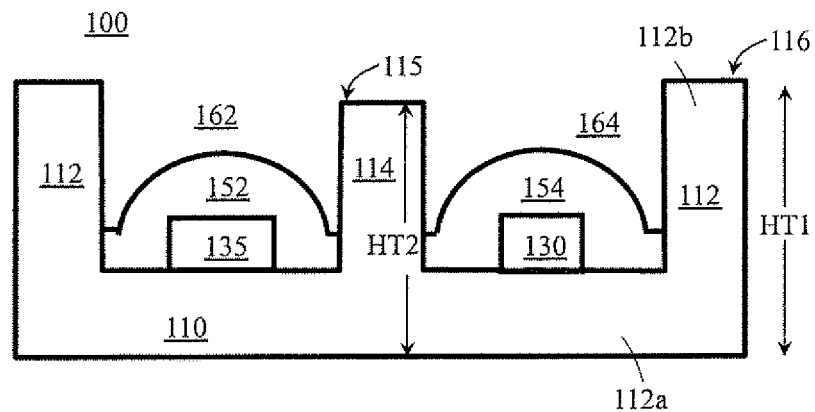
FIG. 1A illustrates a cross-sectional view of a proximity sensor device.

FIGS. 1A-1F illustrate an embodiment of a proximity sensor device 100. The proximity sensor device 100 may be an optical package as shown in FIGS. 1A-1F. The proximity sensor device 100 comprises a body 110, a detector 130 and an emitter 135. The body 110 may further comprise at least one sidewall 112 and a separation wall 114. The at least one sidewall 112 and the separation wall 114 may define a first aperture 162 and a second aperture 164 as shown in FIG. 1A. The detector 130 may be a photo-diode die, a photo-transistor die or any other devices capable of detecting radiation. The detector 130 may comprise integrated amplifying circuits or any other circuits for processing the signal received by the detector 130.

The emitter 135 may be configured to emit light or radiation, which may include both visible and non-visible light and any other electromagnetic radiation. The emitter 135 may be may be a semiconductor-based light emitting diode (referred herein after as "LED") emitting visible light or other light sources capable of emitting electromagnetic radiation that is invisible such as, but not limited to, ultra violet or infra red light or any other radiation of other wavelengths. The term "light" may be narrowly interpreted as only a specific type of electromagnetic wave but in this specification, all possible variations of electromagnetic waves should be taken into consideration when a specific type of light or radiation is discussed unless explicitly expressed otherwise. For example, ultra-violet, infra-red and other invisible radiation should be included when considering the term "light" although literally light means radiation that is visible to the human eye.

The separation wall 114 may be an optical structure adjoining first and second apertures 162, 164 having optical properties such as ability to reflect light. As will be discussed in greater detail subsequently herein, the separation wall 114 of the body 110 is configured to block direct light transmission between the emitter 135 and the detector 130. The emitter 135 and the detector 130 may be optically separated by the separation wall 114 of the body 110 such that the detector 130 may be arranged to receive and detect light emitted by the emitter 135 via reflection from an external object 199 when the external object 199 is arranged between a predetermined distance from a reference point on the proximity sensor device 100.

The proximity sensor device 100 may optionally comprise a first optical component 152 optically coupled to the emitter 135 and a second optical component 154 coupled to the detector 130. The first and second optical components 152, 154 may be made from glass, epoxy or silicone that is substantially transparent. The first and second optical components 152, 154 may not be in direct contact with the emitter 135 and/or the detector 130.

In the embodiment shown in FIG. 1A, the first and second optical components 152, 154 may be made from an encapsulant material encapsulating the emitter 135 and the detector 130 respectively. The encapsulant material may be silicone, epoxy or other material, which may be adapted to encapsulate the emitter 135 and the detector 130 when the encapsulant material is in liquid form during an early phase of the manufacturing process. The first and second optical components 152, 154 may comprise an optical lens configured to focus or collimate light. In another embodiment, the first and second optical components 152, 154 may be optical transparent material for transmitting light without lens functionality.

The body 110 may refer to a structure or a base, which may provide structural support for other components such as the emitter 135 and the detector 130. In the embodiment shown in FIG. 1A, the body 110 may be molded from plastic, ceramic or any other material made from an encapsulant initially in liquid form but then cured to solid form towards the end of manufacturing process. In another embodiment, the body 110 may be a flat substrate such as a PCB or other material.

In the embodiment shown in FIGS. 1A-1F, the body 110 comprises at least one sidewall 112 and the separation wall 114 formed integrally to the body 110. The first aperture 162 may be configured to accommodate the emitter 135 and the first optical component 152 whereas the second aperture 164 may be configured to accommodate the detector 130 and the second optical component 154. As shown in FIG. 1A, the first and second apertures 162, 164 may define a cup shape configured to direct light.

As shown in FIG. 1A, the body 110 may have a bottom end 112a for engaging an external surface located below the proximity sensor device 100 and a top end 112b for engaging another external surface located above the proximity sensor device 100. The top end 112b and the bottom end 112a may be located at the at least one sidewall 112. Alternatively, the top end 112b and the bottom end 112a may be located at the separation wall 114. The proximity sensor device 100 may have a first height dimension HT1, extending from the bottom end 112a to the top end 112b of the body 110. The first height dimension HT1 may optionally represent the tallest height dimension of the proximity sensor device 100 as shown in FIG. 1A.

Figure 1B:
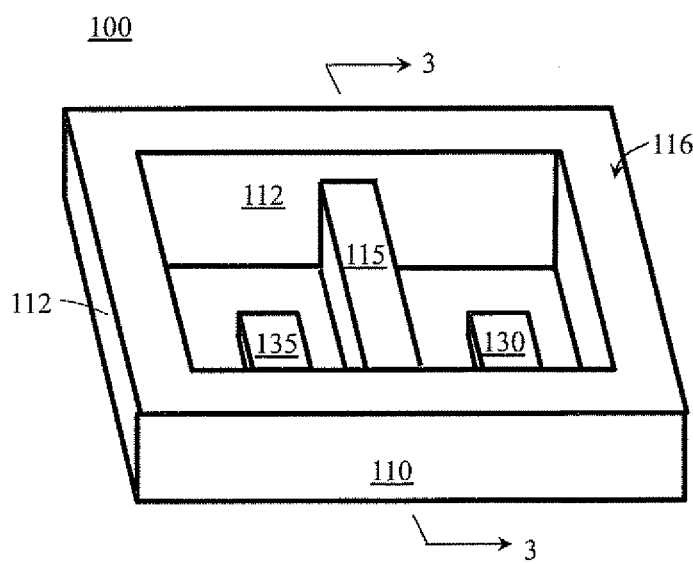
FIG. 1B illustrates an isometric view of the proximity sensor device shown in FIG. 1A.

As shown in FIG. 1B, the body 110 may comprise a top surface 116 coupled to the top end for engaging an external surface located above the proximity sensor device 100. FIG. 1B illustrates an isometric view of the proximity sensor device 100 without showing the first and second optical components 152, 154. As shown in FIG. 1B, the separation wall 114 may have a top surface 115. The top surface 115 may be reflective in one embodiment.

Figure 1C:
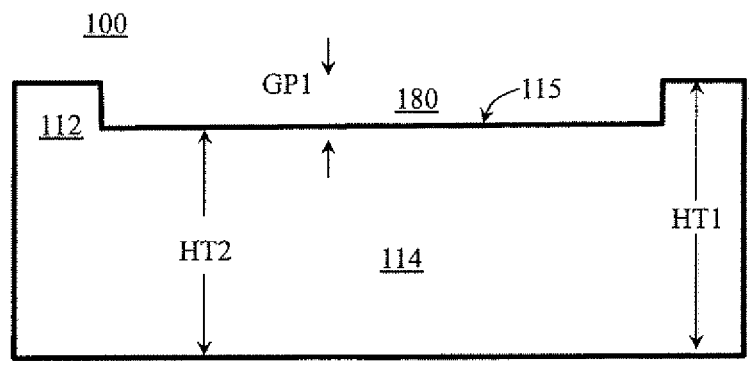
FIG. 1C illustrates a cross-sectional view of the proximity sensor device taken along line 3-3 shown in FIG. 1B.

FIG. 1C illustrates a cross-sectional view of the proximity sensor device 100 taken along line 3-3 shown in FIG. 1B. As can be seen in FIG. 1A and FIG. 1C, the proximity sensor device 100 may have a second height dimension HT2 in parallel to the first height dimension HT1 extending from the bottom end 112a to the top surface 115 of the separation wall 114 along the separation wall 114 as shown in FIG. 1C. The second height dimension HT2 may be shorter than the first height dimension HT1 to define an internal channeling section 180 located above the top surface 115 of the separation wall 114. The internal channeling section 180 may have a height dimension GP1. The sum of the height dimension GP1 of the internal channeling section 180 and the second height dimension HT2 may be substantially equal to the first height dimension HT1.

Figure 1D:
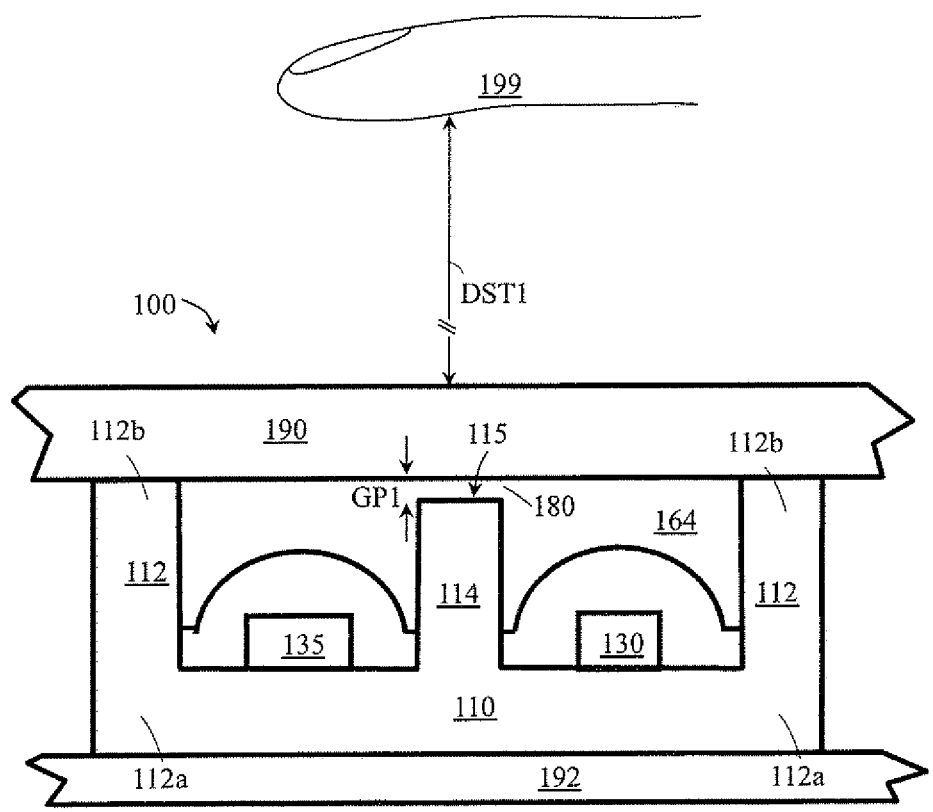
FIG. 1D illustrates how the proximity sensor device shown in FIG. 1A interacts with an external casing and an external object.

FIG. 1D illustrates a cross-sectional view of the proximity sensor device 100 when the proximity sensor device 100 is used in a mobile device. As shown in FIG. 1D, the top end 112b of the body 110 may engage a bottom surface of a casing 190 whereas the bottom end 112a of the body 110 may engage an upper surface of a substrate 192. Both the casing 190 and the substrate 192 may be a portion of the mobile device and not part of the proximity sensor device 100. As the proximity sensor device 100 engages both the casing 190 and the substrate 192, the proximity sensor's first height dimension HT1 may have an impact on the manufacturing variation on the mobile device 190, 192. In one embodiment, the body 110 may be made compressible to absorb any such variation and add tolerance to the assembling of parts of the mobile device 190, 192.

As shown in FIG. 1D, the internal channeling section 180 may be located between the casing 190 and the top surface 115 of the separation wall 114. The internal channeling section 180 may be shaded from view of any external objects 199 as the casing 190 covers the internal channeling section 180 and may make it inaccessible to the external object 199. The proximity sensor device 100 is usually configured to detect the presence of an external object 199 positioned at a predetermined distance DST1 from a reference point located adjacent to the proximity sensor device 100. For example, the predetermined distance DST1 may be measured from a point on the casing 190 as shown in FIG. 1D. Optionally, the reference point chosen may be one point on the top surface 115 of the separation wall 114. If the reference point is chosen on one point of the body 110, the thickness of the casing 190 may need to be taken into consideration.

Figure 1E:
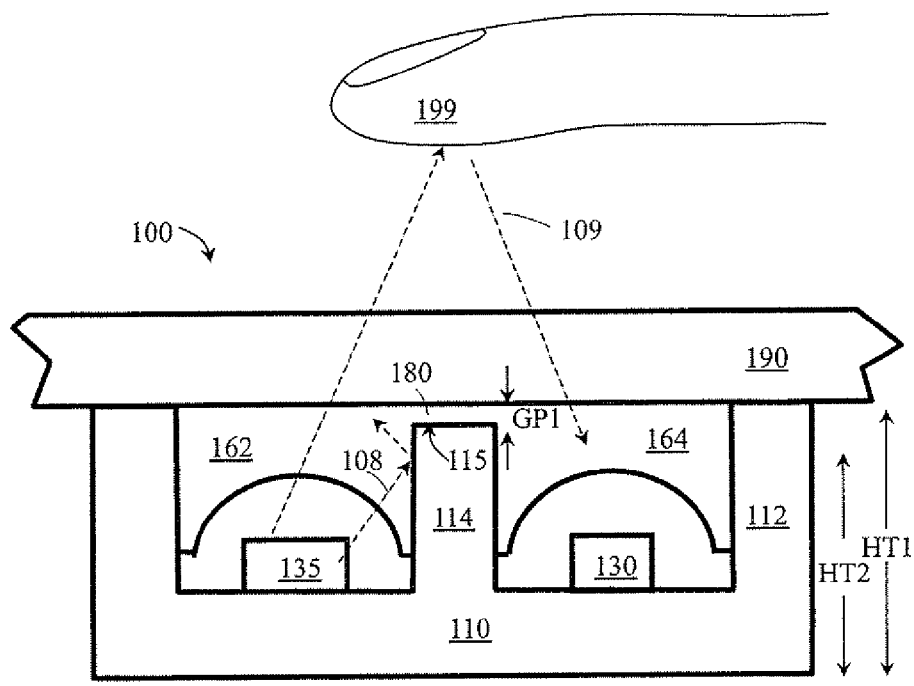
FIG. 1E illustrates how the proximity sensor device is configured to detect an external object.

FIG. 1E explains how the proximity sensor device 100 is configured to detect the presence of the external object 199. Although a finger is used as illustration as the external object 199, the external object 199 may be anything, for example, but not limited to, a living thing, a non-living thing, or a body part of a human being etc. In some applications where detection of a portion of human body is more desirable, the emitter 135 may be configured to emit infrared light and the detector 130 may be configured to optimally detect light having wavelength between 650 nm to 880 nm.

As shown in FIG. 1E, the light emitted by the emitter 135 may not reach the detector 130 directly unless the external object 199 reflects the light back to the detector 130. This is illustrated through ray 109 in FIG. 1E. The separation wall 114 does not engage the casing 190. Although the internal channeling section 180 is configured to channel light between the first and second apertures 162, 164, light emitted from the emitter 135 will not reach the detector 130 directly. Generally, the separation wall 114 is configured to direct light away such that light is reflected away from the detector 130 as illustrated by ray 108. The height dimension GP1 of the internal channeling section 180 is sufficiently small and the second height HT2 is sufficiently tall such that the light emitted from the emitter 135 is blocked from reaching the detector 130 directly.

A small portion of light emitted from the emitter 135 may reach the detector 130 through internal reflection by the sidewall 112, the separation wall 114 and the casing 190 without going through the external object 199. This is known as crosstalk and may be considered as noise to the proximity sensor device 100. In one embodiment, the crosstalk may be reduced to a insignificant level when the second height dimension HT2 is chosen to be more than 85% of the first height dimension HT1. In another embodiment where the first and second height dimensions HT1 and HT2 are measured in one or more other locations of the body 110, a similar result is obtained. The crosstalk consideration will be discussed in greater details in FIG. 2.

Figure 1F:
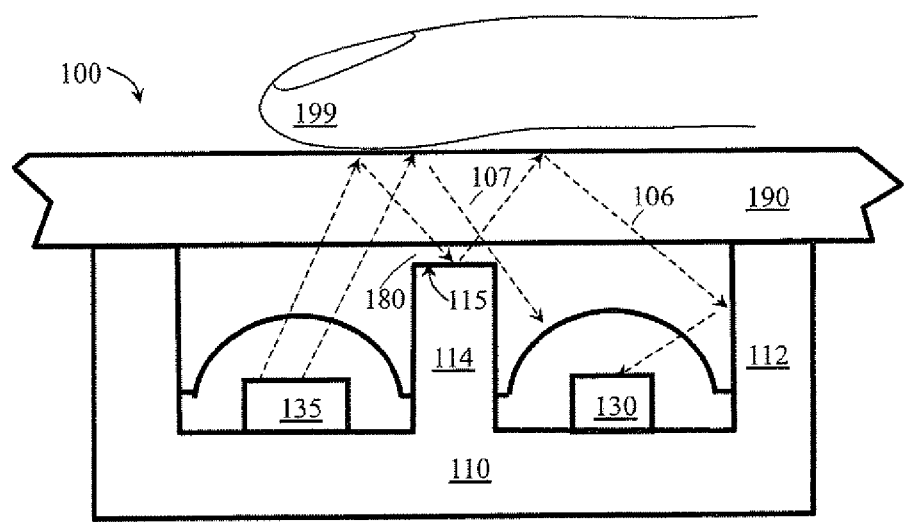
FIG. 1F illustrates how the proximity sensor device is configured to detect an external object located at close proximity.

FIG. 1F illustrates how light is reflected when the external object 199 is located at a close proximity from the proximity sensor device 100. The close proximity may also be known as a blind spot as many conventional proximity sensors are incapable of detecting the external object 199 at such close proximity. The close proximity may be a distance approximately between 0 mm and 0.5 mm measuring vertically from any point on the casing 190. The close proximity may also include zero distance, indicating the external object 199 touches or is in direct contact with the casing, or even a negative distance where the external object 199 compresses the proximity sensor device 100 through the casing 190. In the embodiment shown in FIGS. 1A-1E, the internal channeling section 180 may enable detection of the external object 199 at close proximity by the following ways discussed in subsequent paragraph.

First, as shown by ray 107, the internal channeling section 180 may provide space for light reflected from the external object 199 to reach the detector. Without the internal channeling section 180, the reflected ray 107 may be blocked from the detector 130. Second, the internal channeling section 180, sandwiched between the external object 199 and the top surface 115 of the separation wall 114, may function as a light channel transmitting light between the first and second apertures 162 and 164 when the external object 199 is located at close proximity. This is illustrated by ray 106. Ray 106 may be reflected first by the external object 199 before being transmitted to the detector 130 through a plurality of subsequent reflections. The subsequent reflection may occur generally, in any sequence, at the sidewall 112, the top surface 115 of the separation wall 114, total internal reflection at the casing 190, and the separation wall 114.

Figure 2:
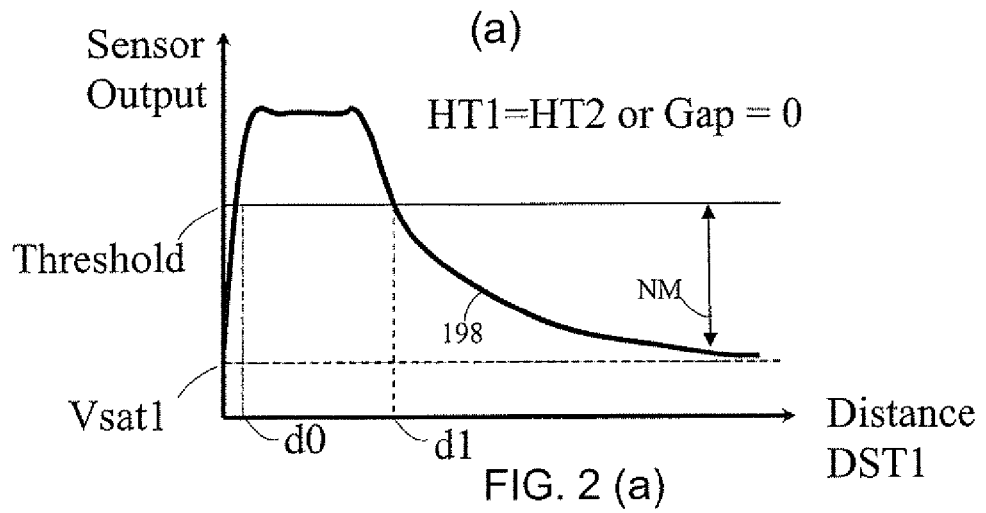
FIGS. 2(a)-2(e) illustrate graphs showing detector outputs of three different proximity sensor devices having different height dimension ratios.
Figure 2:
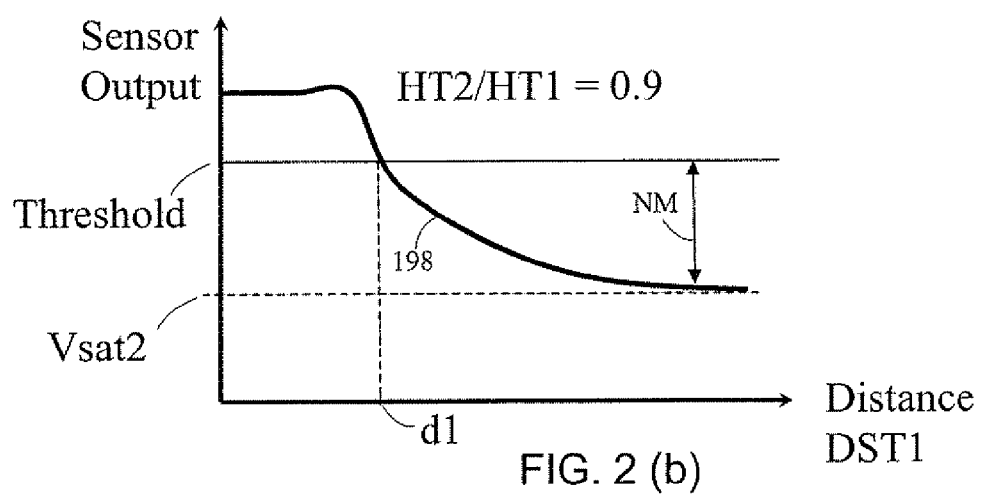
Figure 2:
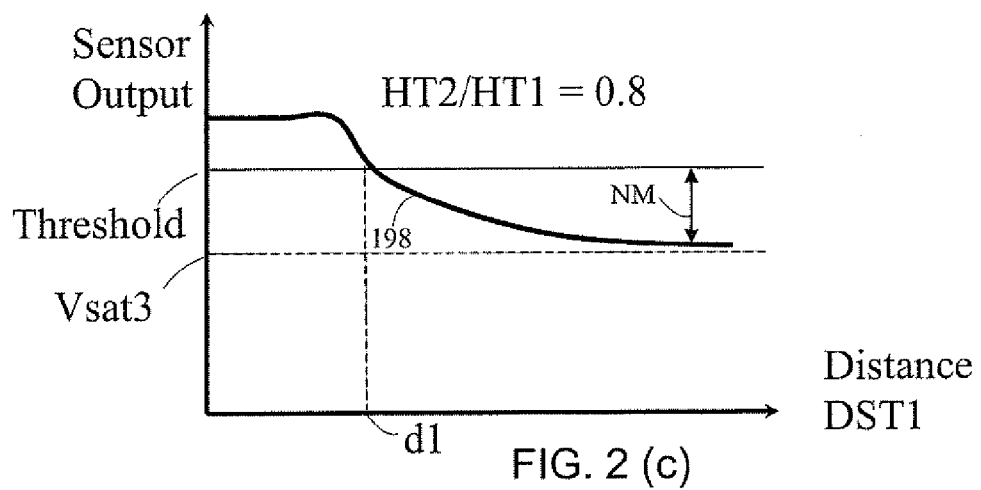

The detector output 198 plotted against the distance DST1 of the external object 199 is illustrated in FIG. 2. FIGS. 2(a)-2(c) illustrate graphs showing detector outputs 198 of three different proximity sensor devices 100 having different height dimension ratios (HT2/HT1) As shown: in the graph FIG. 2(a) is plotted on a device having the first height dimension HT1 substantially equal to the second height dimension HT2; in the graph FIG. 2b is plotted on a device having the ratio of the second height dimension HT2 to the first height dimension HT1 of approximately 90%; and in the graph FIG. 2(c) is plotted on a device having the ratio of the second height dimension HT2 to the first height dimension HT1 of approximately 80%.

A predetermined threshold value is selected in order to determine the presence of the external object 199. Consider a situation where an external object 199 moves from a far distance towards the proximity sensor devices 100 having different height dimension ratios (HT2/HT1) and touches the proximity sensor device 100 (having DST1=0 mm) at the end. As illustrated by all three graphs, the detector output 198 may be at Vsat1, Vsat2, and Vsat3 respectively when the external object 199 is located far away from the proximity sensor devices 100. The detector output 198 recorded on all three proximity sensor devices 100 increase respectively as the external object 199 moves closer to the proximity sensor devices 100. When distance DST1 of the external object 199 from the proximity sensor device 100 is less than d1, the detector output 198 for all three graphs is more than the predetermined cut-off threshold value and the external object 199 is deemed to be present.

As the external object 199 moves closer, the detector output 198 increases and saturates at a fixed value. However, when the external object 199 is at close proximity (less than d0), the detector output 198 for the graph FIG. 2(a) drops. In contrast, for graphs FIG. 2(b) and FIG. 2(c) the detector output 198 may remain substantially fixed. In the setting of FIG. 2(a), the first and second height dimensions HT1, HT2 are substantially equal. This means that the internal channeling section 180 has a zero height dimension GP1. In other words, the internal channeling section 180 does not exist. Without the internal channeling section 180, the proximity sensor device 100 is susceptible to blind spot issues and is unable to detect the external object 199 when the external object 199 is located in close proximity, or when the distance is less than d0. However, for the proximity sensor devices 100 in FIG. 2(b) and FIG. 2(c), the internal channeling section 180 enables the proximity sensor devices 100 to detect at close proximity for distance less than d0.

The noise margin NM of the proximity sensor device 100 is defined as the difference between the cut-off threshold value and the detector output 198 (Vsat1, Vsat2, and Vsat3) when the external object 199 is located far away from the proximity sensor devices 100 as illustrated in FIGS. 2(a)-2(c). As shown, the noise margin NM may be reduced when the ratio of the second height dimension HT2 to the first height dimension HT1 is reduced. As explained earlier, when the height dimension GP1 of the internal channeling section 180 increases, crosstalk increases concurrently and thus, reduces the noise margin.

Figure 3A:
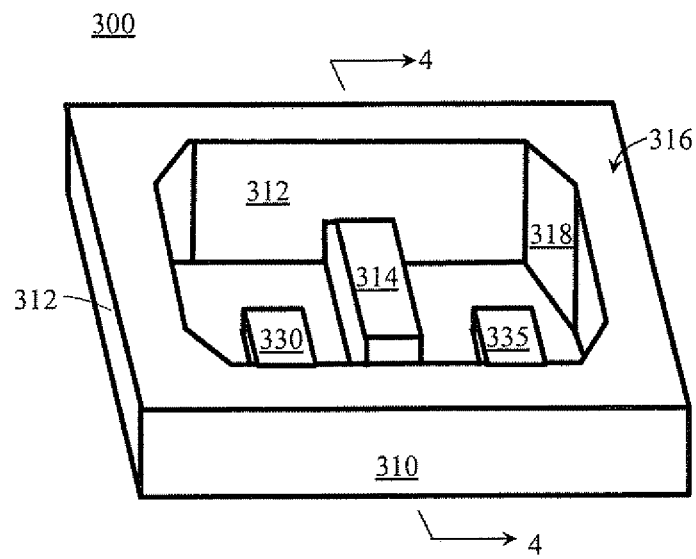
FIG. 3A illustrates an isometric view of a proximity sensor device having an internal channeling section with a narrow portion and a wide portion.
Figure 3B:
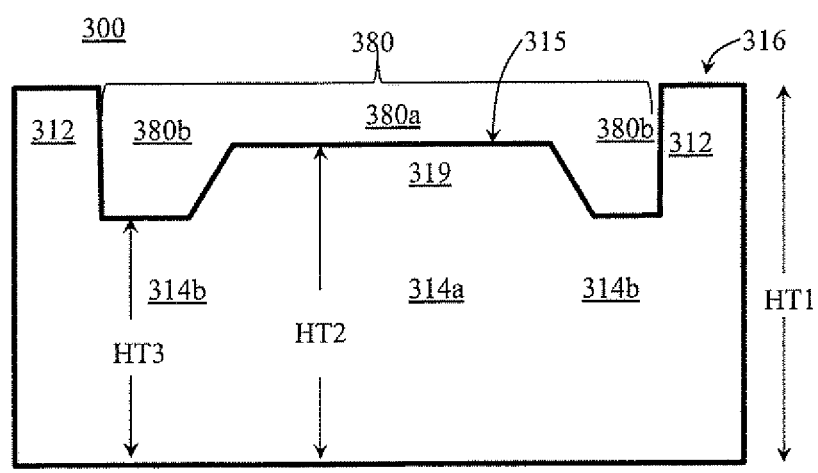
FIG. 3B illustrates a cross-sectional view of the proximity sensor device shown in FIG. 3A taken along line 4-4.
Figure 3C:
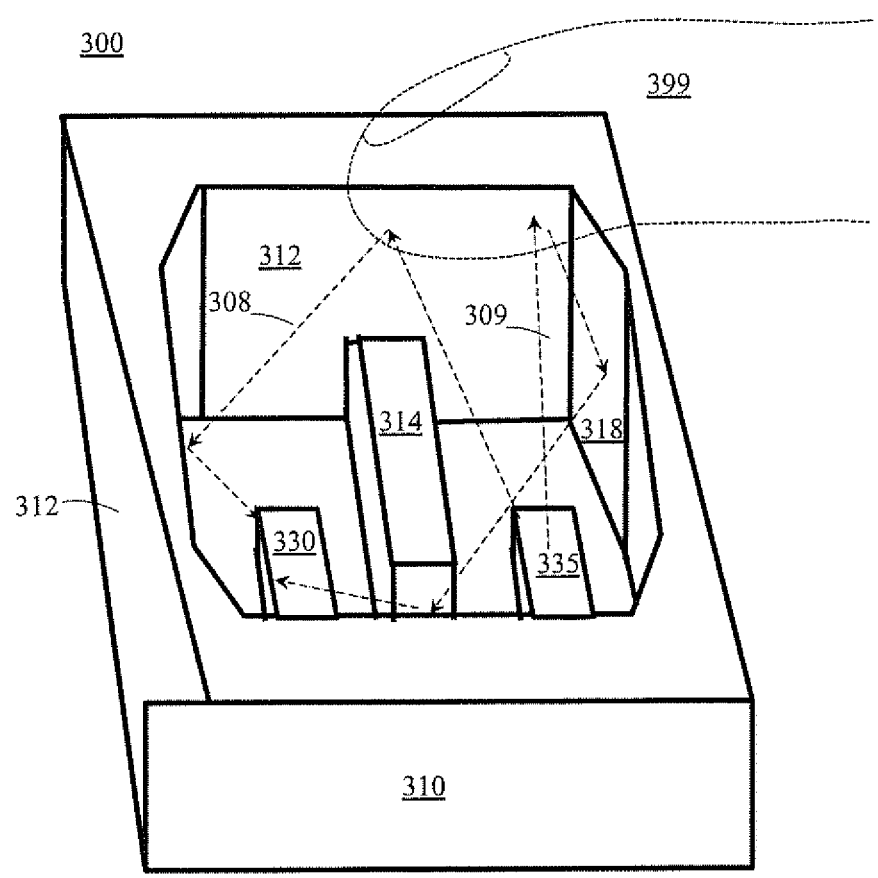
FIG. 3C illustrates how the proximity sensor device shown in FIG. 3A is configured to detect a close external object using wide portion of the gap.

FIGS. 3A-3C illustrates an alternative embodiment of a proximity sensor device 300. FIG. 3A illustrates an isometric view of the proximity sensor device 300 whereas FIG. 3B illustrates a cross-sectional view of the proximity sensor device 300 taken along line 4-4 shown in FIG. 3A. The proximity sensor device 300 may comprise an emitter 335, a detector 330, a body 310 having a separation wall 314 and at least one sidewall 312. The body 310 may have a top surface 316 for engaging an external casing (not shown). The separation wall 314 may have bump 319. The bump 319 may have a top flat surface 315.

In another embodiment, the top surface 315 of the bump 319 may be in alignment with the top surface 316 of the body 310. In other words, the top surface 315 of the bump 319 may be configured to engage an external casing (not shown) in addition to the top surface 316. In yet another embodiment, the top surface 315 of the bump 319 may be the only structure for engaging the external casing (not shown).

Referring to FIG. 3B, the proximity sensor device 300 may have a first height dimension HT1 extending from one end to the other end of the body 310. The first height dimension HT1 may represent the tallest height dimension of the proximity sensor device 300 in the vertical direction as shown in FIG.

3B. The separation wall 314 may have a second height dimension HT2 shorter than the first height dimension HT1 such that an internal channeling section 380 is defined above the separation wall 314. The internal channeling section 380 may comprise a narrow portion 380a and at least one wide portion 380b due to the bump 319.

The internal channeling section 380 of the proximity sensor device 300 shown in FIG. 3B has one narrow portion 380a located at the center with two wide portions 380b sandwiching the narrow portion 380a. As shown in FIG. 3B, the separation wall 314 may have a third height dimension HT3 measured in parallel to the first and second height dimensions HT1, HT2 as shown in FIG. 3B. The third height dimension HT3 measured along an axis crossing through the wide portion 380b of the internal channeling section 380 may have shorter height compared to the second height dimension HT2. As will be discussed in further details in the next paragraph, this arrangement may have a benefit of low crosstalk while enabling detection of the external object 399.

The narrow portion 380a of the internal channeling section 380 may be located adjacent to the center portion 314a of the separation wall 314. The emitter 335 and the detector 330 may be disposed adjacent to the center portion 314a. As a result, the center portion 314a of the separation wall 314 may play a more significant role in optically separating the emitter 335 from the detector 330. Having the narrow portion 380a of the internal channeling section 380 approximating the center portion 314a of the separation wall 314 may yield a smaller crosstalk.

Consequently, the wide portion 380b of the internal channeling section 380 may be located proximate to the side portions 314b of the separation wall 314 where a lower height dimension HT3 has less significant impact. A reflective surface 318 may be positioned accordingly to channel light towards the wide portion 380b in order to direct light through the wide portion 380b of the internal channeling section 380 as illustrated in FIG. 3C.

FIG. 3C illustrates how the proximity sensor device 300 is configured to detect an external object 399 located at close proximity using the wide portion 380b of the internal channeling section 380. A transparent external casing (not shown) may be located above the proximity sensor device 300. As illustrated by ray 309, when an external object 399 is present at a close proximity to the proximity sensor device 300, light reflected back from the external object 399 may be reflected or directed by the reflective surface 318 towards the wide portion 380b of the internal channeling section 380, and subsequently towards the detector 330 through subsequent reflections at the sidewall 312, and total internal reflection of the easing (not shown) as explained earlier. In addition, the wide portion 380b may provide space for channeling reflected light towards the detector 330 if the external object 599 is present near the wide portion 380b of the internal channeling section 380 as illustrated by ray 308.

Figure 4A:
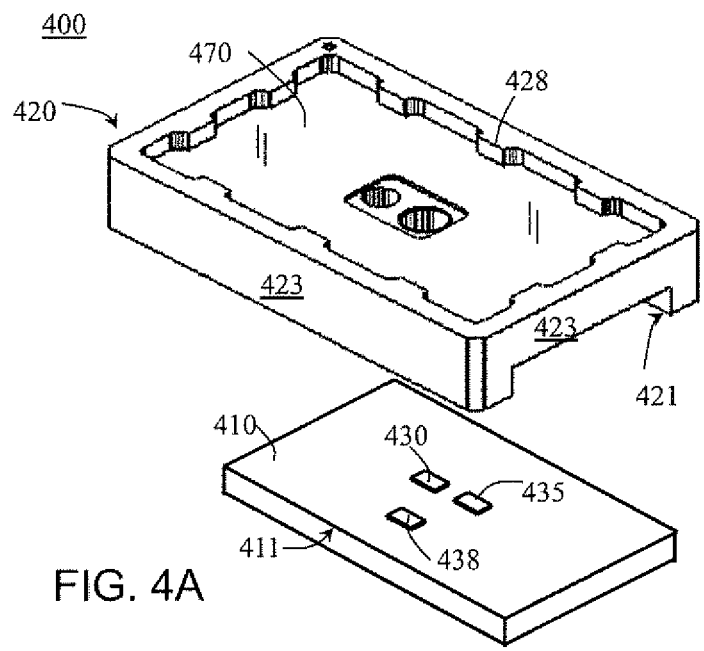
FIG. 4A illustrates an exploded isometric view a proximity sensor assembly.
Figure 4B:
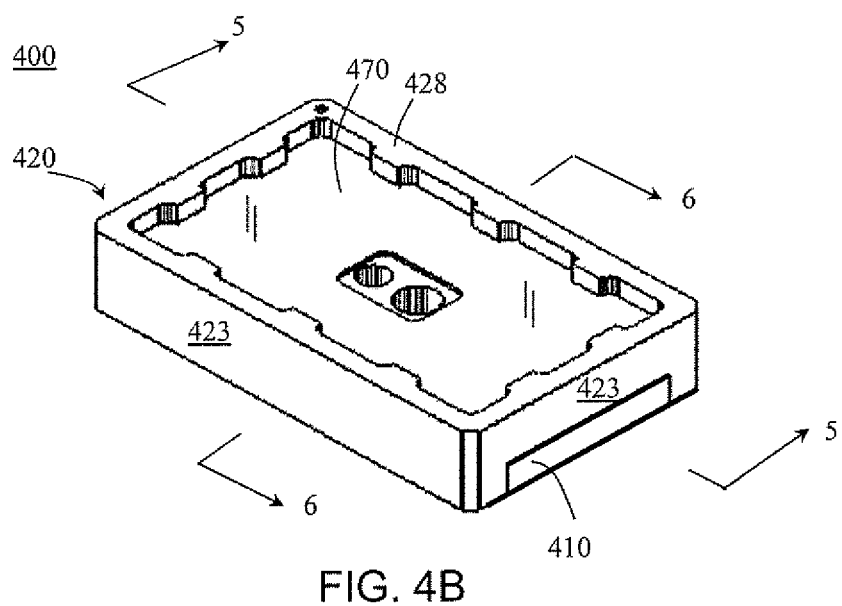
FIG. 4B illustrates an isometric view of the proximity sensor assembly shown in FIG. 4A.
Figure 4C:
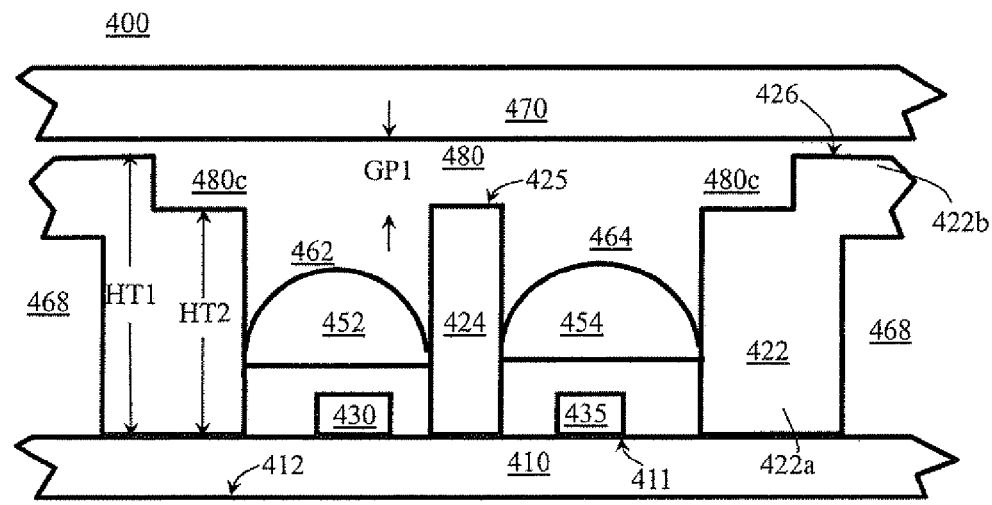
FIG. 4C illustrates a partial cross-sectional view of the proximity sensor shown in FIG. 4A taken along line 5-5.
Figure 4D:
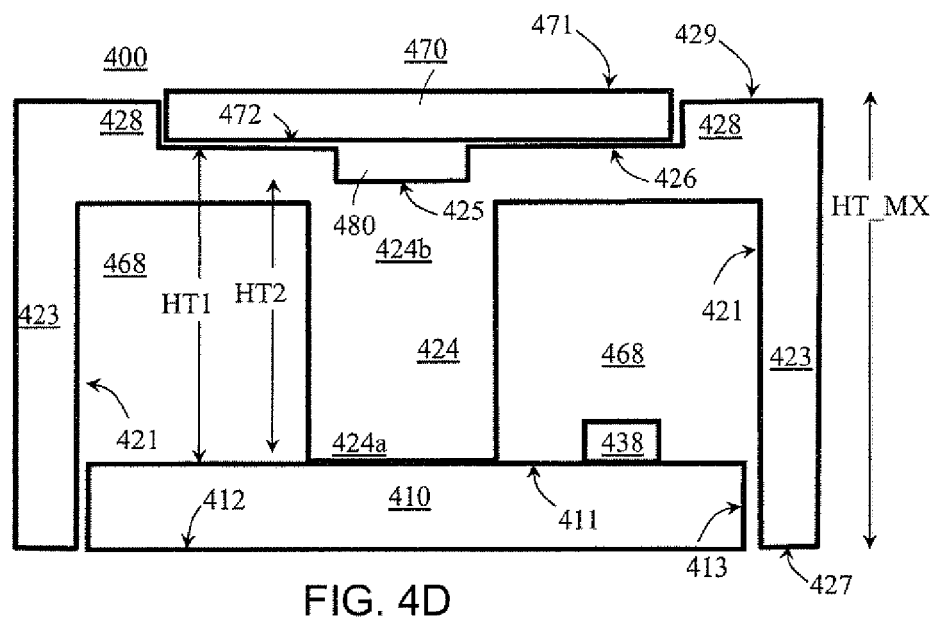
FIG. 4D illustrates a cross-sectional view of the proximity sensor shown in FIG. 4A taken along line 6-6.

The concept employed in the previously presented embodiments may be applied to proximity sensor assemblies, such as a proximity sensor assembly 400 shown in the embodiment illustrated in FIGS. 4A-4D. FIG. 4A illustrates an exploded isometric view of the proximity sensor assembly 400; FIG. 4B illustrates an isometric view of the proximity sensor assembly 400; FIG. 4C illustrates a partial cross-sectional view of the proximity sensor assembly 400 taken along line 5-5 shown in FIG. 4B; and FIG. 4D illustrates a cross-sectional view of the proximity sensor assembly 400 taken along line 6-6 shown in FIG. 4B.

Referring to FIGS. 4A-4D, the proximity sensor assembly 400 may comprise a substrate 410, an optical structure 420, a detector 430, an emitter 435 and a substantially transparent layer 470. The substrate 410 may have a substantially horizontal plane and the emitter 435 and the detector 430 may be disposed on the substrate 410. One or more additional semiconductor die 438 may be disposed on the substrate 410. The one or more additional semiconductor die 438 may be for other functionality other than proximity sensing. For example, in one embodiment, the one or more additional semiconductor die 438 may be a protection diode for electrostatic charge protection.

The optical structure 420 may be disposed on the substrate 410. As shown in FIGS. 4A-4B, the optical structure 420 may have an external sidewall 423 and a side inner surface 421 to engage a side surface 411 of the substrate 410. The optical structure 420 may be resilient and compressible. By having the substrate 410 concealed within the resilient optical structure 420 as shown in FIG. 4B, the substrate 410, as well as the emitter 435 and the detector 430 may be better protected as the resilient optical structure 420 may absorb the impact of an external force.

Similarly, the optical structure 420 may comprise a ledge portion 428 for engaging the substantially transparent layer 470 such that the substantially transparent layer 470 resides within the optical structure 420 as shown in FIGS. 4B and FIG. 4D. The proximity sensor assembly 400 may form a portion of an electronic device (not shown). The transparent layer 470 may be a portion of the proximity sensor assembly 470, or alternatively, the transparent layer 470 may form a portion of an external casing of the electronic device (not shown).

Referring to FIG. 4C, the optical structure 420 may comprise at least one sidewall 422, a separation wall 424, a first aperture 462 and a second aperture 464. The first and second apertures 462, 464 may be defined by the separation wall. 424 and the at least one sidewall 422. The separation wall 424 may be a portion of the optical structure 420 adjoining the first and second apertures 462, 464. The separation wall 424 may have a top surface 425. An internal channeling section 480 is configured to adjoin the first and second apertures 462, 464 above the separation wall 424 as shown in FIG. 4C. The internal channeling section 480 may have a portion 480c extend above a portion of the sidewall 422. The internal channeling section 480 may have a height dimension GP1. The internal channeling section 480 is configured to direct light between the first and second apertures 462, 464 when an external object (not shown) presents at close proximity as explained earlier.

The first aperture 462 may be configured to accommodate the emitter 435 whereas the second aperture 464 may be configured to accommodate the detector 430. The first and second apertures 462, 464 may be configured to direct light. A first and second optical components 452, 454 may be disposed within the first and second apertures 462, 464 respectively. In the embodiment shown in FIG. 4C, the first and second optical components 452, 454 may be an optical lens positioned distanced away from the emitter 435 and the detector 430. Upon completion of the assembly, the emitter 435 and the detector 430 may still be easily accessible by removing the optical structure 420 as the emitter 435 and the detector 430 are not encapsulated permanently by the first and second optical structures 452, 454.

Referring to FIG. 4C, the optical structure 420 may have a bottom portion 422a for engaging the substrate 410, and a top portion 422b for engaging the casing 470. The substrate 410 may have a top surface 411 and a bottom surface 412. The separation wall 424 of the optical structure 420 may have a bottom end 424a for engaging the top surface 411 of the substrate 410 and a top end 424b approximating the transparent layer 470.

As shown in FIG. 4D, the optical structure 420 may further comprise a bottom surface 427 that is substantially aligned to the bottom surface 412 of the substrate 410. Similarly, the transparent layer 470 may have a top surface 471 and a bottom surface 472. A top surface 429 of the optical structure 420 may be substantially in alignment with the top surface 471 of the transparent layer 470. The optical structure 420 may have an additional top surface 426 below the ledge 428 configured to engage the bottom surface 472 of the casing 472. The optical structure 420 may comprise an outer cavity 468 located between the sidewall 422 and the external sidewall 423, or between the separation wall 424 and the external sidewall 423. The embodiment shown in FIG. 4D may have at least two outer cavities 468. The substrate 410 may be configured to accommodate other electronic devices such as the one or more semiconductor die 438 disposed on the substrate 410 but within the outer cavity 468. In this way, the optical structure 420 may be configured to provide protection for these electronic devices.

Referring to FIGS. 4C and 4D, the optical structure 420 may have a plurality of height dimensions. The tallest height dimension, HT_MX may extend from the bottom surface 427 to the top surface 429 of the optical structure 420. The first height dimension HT1, extends from the top surface 411 of the substrate 410 to the additional top surface 426 that is configured to engage the transparent layer 470. As the emitter 435 and the detector 430 are disposed on the substrate 410, the distance extending between the transparent layer 470, and the emitter 435 and detector 430 may be fixed at a value substantially close to the first height dimension HT1. This is subject to minor variations due to the fact that the optical structure 420 may be compressible. In one embodiment, the first height dimension HT1 and the tallest height dimension HT_MX may vary approximately within 10% when the optical structure 420 is compressed.

As shown in FIGS. 4C and 4D, in order to provide room for the internal channeling section 480, the optical structure 420 may have a second height dimension HT2 extending vertically along the separation wall 424. As the internal channeling section 480 may comprise a portion 480c that extends above the sidewall 422, a portion of the sidewall 422 may have a similar height dimension as HT2 measured vertically.

FIGS. 5A-5E illustrate an embodiment of a proximity sensor assembly 500 used in an electronic device (not shown). The proximity sensor assembly 500 may comprise a substrate 510, an optical structure 520, a detector 530, an emitter 535, and a casing 570. The casing 570 may encase the entire electronic device (not shown and not merely the proximity sensor assembly 500. Thus, the casing 570 may be larger than the drawing shown in FIG. 5A. Similarly, the substrate 510 may be configured to accommodate other electronic components (not shown) and may be much larger than the drawing shown in FIG. 5A.

Figure 5A:
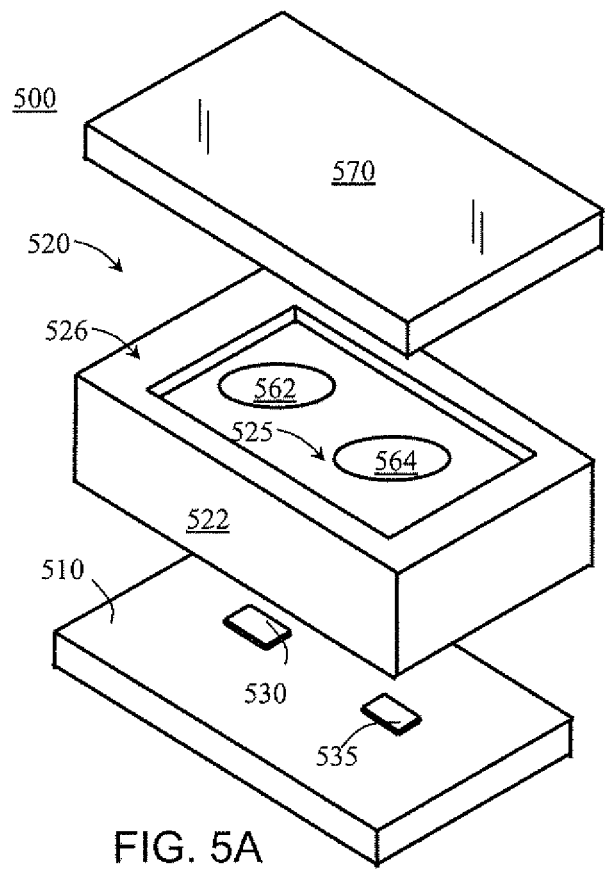
FIG. 5A illustrates an exploded isometric view of an alternative proximity sensor assembly having multiple reflective surfaces.
Figure 5B:
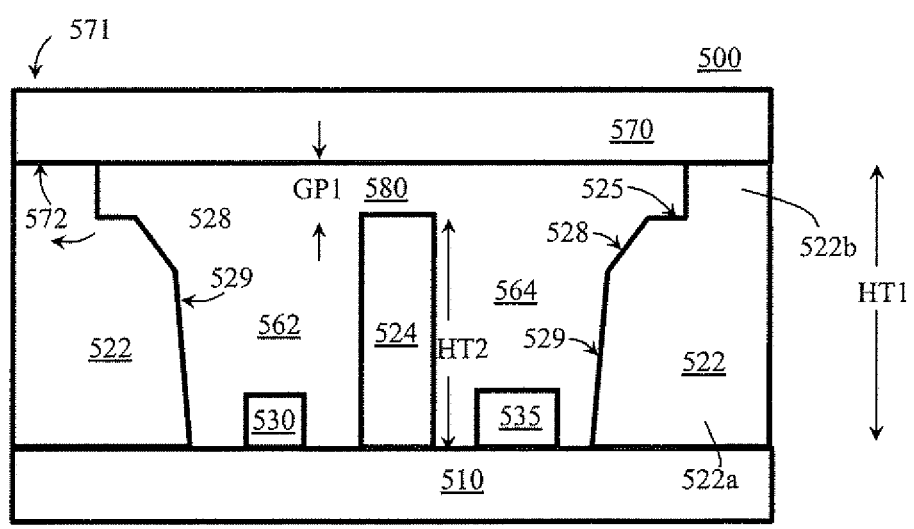
FIG. 5B illustrates a cross-sectional view of the proximity sensor assembly shown in FIG. 5A.

The optical structure 520 may comprise a bottom end 522a for engaging the substrate 510, and a top end 522b for engaging the casing 570. The casing 570 may have a top surface 571 and a bottom surface 572. A top flat surface 526 of the optical structure 520 is configured to receive the bottom surface 572 of the casing 570. The optical structure 520 may comprise first and second apertures 562, 564 extending from bottom end of 522a to the top end of 522b of the optical structure 520. As shown in FIGS. 5A-5B, the first and second apertures 562, 564 may be connected internally by an internal channeling section 580. The internal channeling section 580 may be located between the casing 570 and an additional top surface 525 above the separation wall 524.

Referring to FIG. 5B, the optical structure 520 may have a first height dimension HT1 that extends vertically. However, a separation wall 524 proximate the first and second apertures 562, 564 may have a second height dimension HT2 to define the internal channeling section 580 above the separation wall 524. The first and second apertures 562, 564 may comprise a first reflective surface 528 and a second reflective surface 529 arranged at different angles for directing light reflected back from an external object 500 located at close proximity.

Figure 5C:
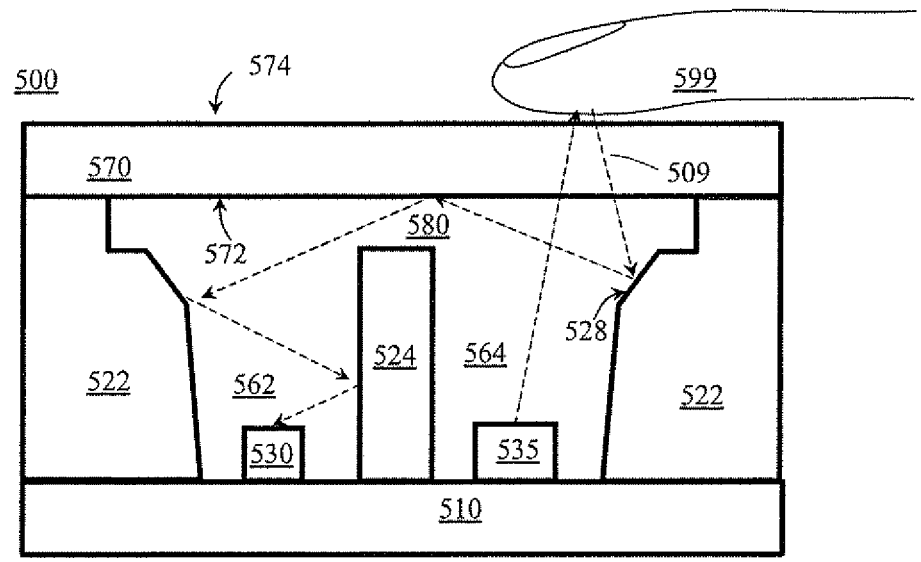
FIG. 5C illustrates how a first reflective surface is configured to direct light when an external object presents at close proximity.
Figure 5D:
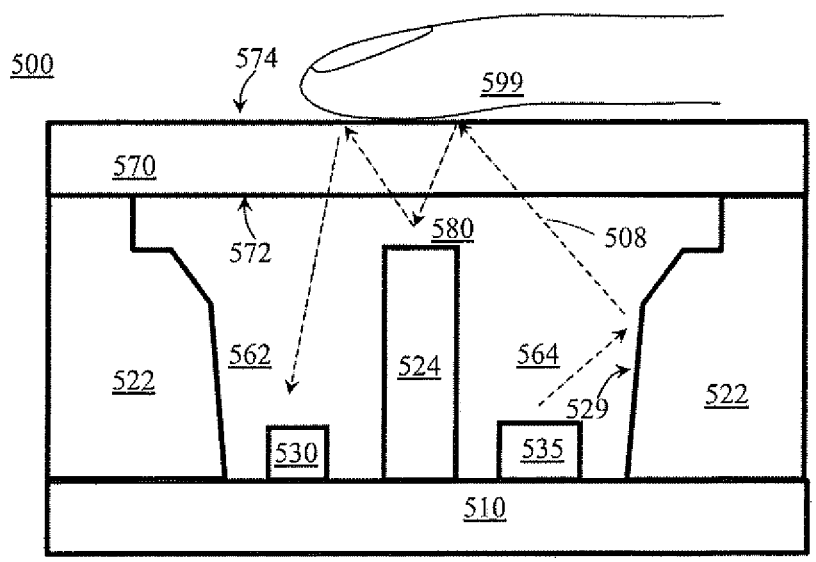
FIG. 5D illustrates how a second reflective surface is configured to direct light when the external object presents at close proximity.

For example, in the embodiment shown in FIG. 5C, the first reflective surface 528 may be arranged such that light reflected back from an external object 599 located at close proximity to the top surface 574 of the casing 570 may be directed towards the detector 530 via the internal channeling section 580 as illustrated by ray 509. In another example shown in FIG. 5D, a portion of the second reflective surface 529 may be configured to direct light towards an external object 599 positioned at close proximity right above the separation wall 524 such that light reflected off the external object 599 may be channeled through the internal channeling section 580 towards the aperture 562 and eventually detected by the detector 530.

Figure 5E:
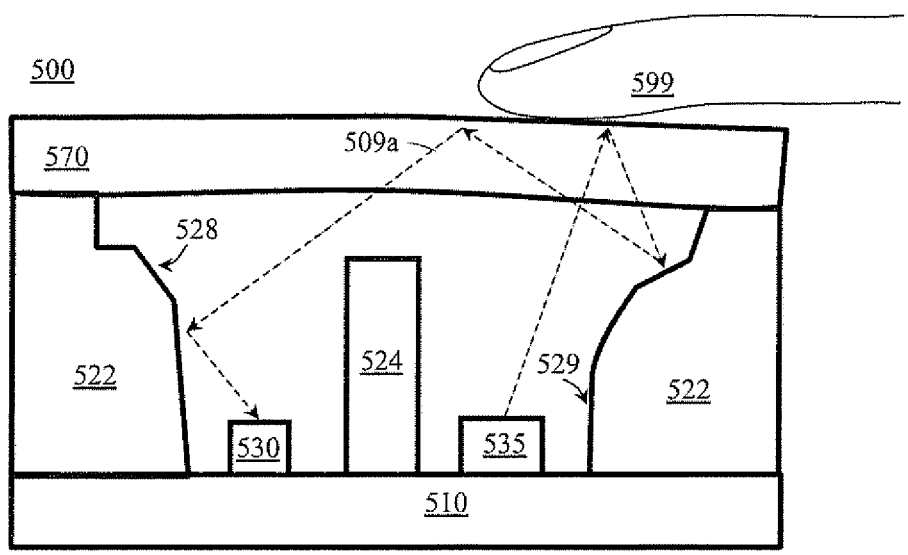
FIG. 5E illustrates how the first reflective surface direct light when the proximity sensor device is compressed.
Figure 5F:
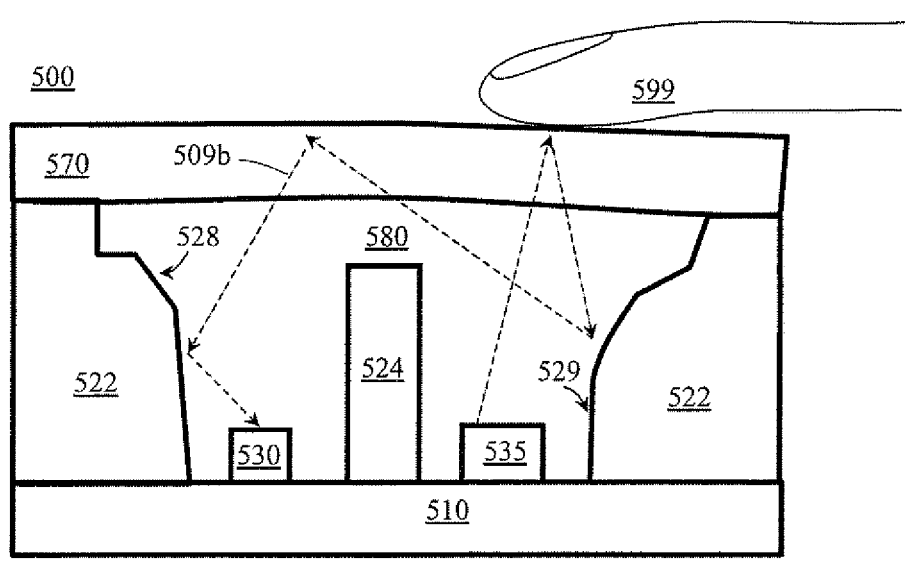
FIG. 5F illustrates how the second reflective surface direct light when the proximity sensor device is compressed.

In addition, the first and second reflective surfaces 528, 529 may be configured to be deformed and to increasingly direct light towards the internal channeling section 580 when the optical structure 520 is compressed. This is illustrated in the example of ray 509a and ray 509b shown in FIG. 5E and FIG. 5F. Comparing FIG. 5E, FIG. 5F and FIG. 5C, when the optical structure 520 is not compressed, the first reflective surface 528 may be configured to direct light towards the internal channeling section 580. However, when the optical structure 520 is compressed, a portion of the second reflective surface 529 may be compressed and increasingly direct reflected light towards the internal channeling section 580 as shown in FIG. 5F in addition to the first reflective surface 528 as shown in FIG. 5E.

Figure 6:
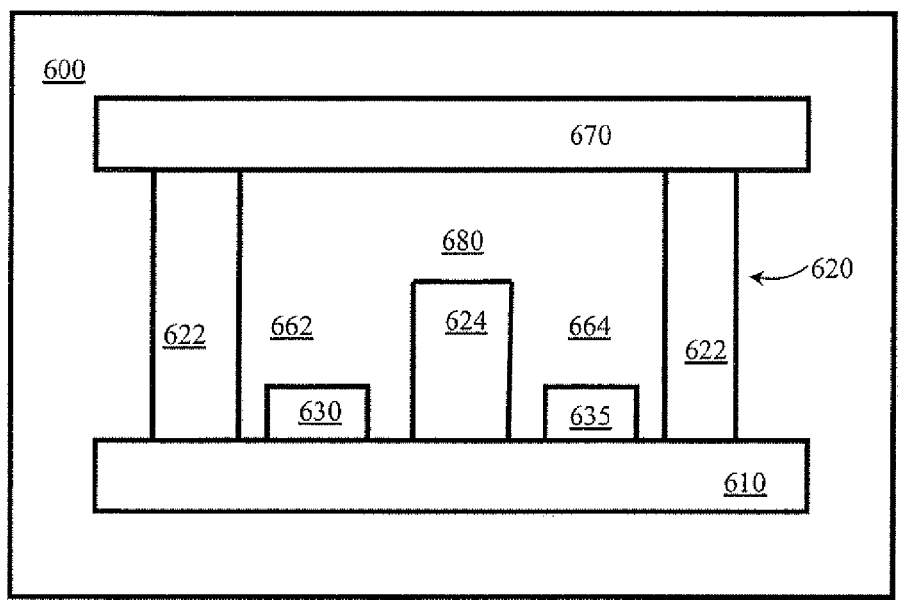
FIG. 6 illustrates a block diagram of a mobile electronic device.

FIG. 6 illustrates an embodiment showing a block diagram of an electronic device 600. The electronic device 600 has proximity sensing functionality, i.e. ability to detect presence of an external object (not shown). The electronic device 600 may be a mobile phone, a portable music player, a portable computer, a tablet, an automotive control system used in automobiles for detecting nearby objects or any other similar devices. The electronic device 600 may comprise a substrate 610, a detector 630, an optical structure 620, an emitter 635 and a casing 670. The optical structure 620 may have some or all of the characteristics of the optical structures 420, 520 or the body 110, 310 of the proximity sensor devices 100, 300 illustrated in previous embodiments.

For example, the optical structure 620 may have a separation wall 624 adjoining two apertures 662, 664 that extend through from one end of the optical structure 620 to the other end of the optical structure 620. The separation wall 624 may be distanced away from the casing 670 to define an internal channeling section 680. The internal channeling section 680 is located between a top surface (not shown) of the separation wall 624 and the casing 670 for directing reflected light to the detector 630 when an external object (not shown) is in close proximity. The internal channeling section 680 may comprise a narrow portion (not shown) and a wide portion (not shown) as illustrated in the embodiment shown in FIGS. 3A-3C.

The optical structure 620 may be compressible and may comprise multiple reflective surfaces (not shown) similar to the first and second reflective surfaces 528, 529 in FIG. 5 that may be configured to increasingly direct reflected light towards the detector 630 when the external object (not shown) compresses the optical structure 620. In particular, for mobile input devices such as a navigation sensor device, the external object (not shown) may apply a force compressing the casing 670 when in use.

Different aspects, embodiments or implementations may, but need not, yield one or more of the following advantages. For example, the height dimension GP1 of the internal channeling section discussed in the embodiment shown in FIG. 1 may have the advantage of enabling detection of external objects at close proximity without significantly increasing crosstalk. Likewise, the dimension of the narrow and large portion of the internal channeling sections may have similar advantages.

Although specific embodiments of the invention have been described and illustrated herein above, the invention should not be limited to any specific forms or arrangements of parts so described and illustrated. For example, emitter described above may be LEDs die or some other future light source die as known or later developed without departing from the spirit of the invention. As explained earlier, the term "light", although literally refers to visible light, should be interpreted to include radiations having invisible wavelengths. Likewise, when an embodiment having an optical device was discussed, the embodiment is applicable to other component levels such as an optical assembly or an optical package to produce the optical device. Similarly, although certain orientation terms such as "lower", "upper", "side", and "disposed on" were used, the scope should not be limited to such orientation. The scope of the invention is to be defined by the claims.

What is claimed is:

1. A proximity sensor device for detecting presence of an external object, the proximity sensor device comprising:
    an emitter configured to emit a radiation;
    a detector configured to detect the radiation emitted from the emitter, and reflected from the external object; and
    a body, the body comprising:
        a top end;
        a bottom end; and
        a separation wall located between the emitter and the detector configured to block the radiation emitted from the emitter from being received directly by the detector;
    wherein the body has a first height dimension extending from the bottom end to the top end;
    wherein the body has a second height dimension in parallel to the first height dimension extending along the separation wall;
    wherein the second height dimension is shorter than the first height dimension of the proximity sensor device to define an internal channeling section; and
    wherein the internal channeling section is located adjacent to the separation wall at the top end and configured to transmit the reflected radiation towards the detector when the external object is in close proximity.

2. The proximity sensor device of claim 1, wherein the separation wall has a top reflective surface.

3. The proximity sensor device of claim 1, wherein the separation wall comprises a bump and the bump comprises the top end of the body.

4. The proximity sensor device of claim 3, wherein the bump comprises a top flat surface configured to engage an external surface.

5. The proximity sensor device of claim 1, wherein the internal channeling section comprises a narrow portion and a wide portion.

6. The proximity sensor device of claim 5, wherein the body further comprises at least one reflective surface configured to direct a portion of the radiation reflected back from the external object in close proximity towards the wide portion of the internal channeling.

7. The proximity sensor device of claim 1, wherein the second height dimension is approximately more than 85% of the first height dimension.

8. The proximity sensor device of claim 1, wherein the body is resilient and compressible.

9. The proximity sensor device of claim 8, wherein the body is configured such that when the external object compresses the proximity sensor device, the amount of radiation transmitted through the internal channeling section increases.

10. A proximity sensor assembly for detecting presence of an external object over an external surface, comprising:
    a substrate having a substantially horizontal plane;
    an optical structure disposed on the substrate;
    a top end of the optical structure coupled with the external surface;
    a first vertical height dimension of the optical structure extending from the substrate to the top end of the optical structure;
    first and second apertures extending through the optical structure;
    an emitter disposed within the first aperture for emitting a radiation;
    a detector disposed within the second aperture for sensing the radiation emitted by the emitter, and reflected by the external object;
    wherein a portion of the optical structure proximate the first and second apertures has a second vertical height dimension shorter than the first vertical height dimension and defining therein an internal channeling section between the optical structure and the external surface;
    wherein the internal channeling section is configured to transmit the radiation from the first aperture to the second apertures when the external object is in close proximity.

11. The proximity sensor assembly of claim 10, wherein the optical structure comprises at least a lens optically coupled to at least one of the emitter and the detector.

12. The proximity sensor assembly of claim 10, wherein the proximity sensor assembly further comprises an additional semiconductor die attached on the substrate, and wherein the optical structure comprises at least one outer cavity configured to accommodate the additional semiconductor die such that the additional semiconductor die is concealed between the optical structure and the substrate.

13. The proximity sensor assembly of claim 10, wherein the optical structure defines a ledge portion for engaging a portion of an external casing defining the external surface.

14. The proximity sensor assembly of claim 10, wherein the optical structure comprises at least a side inner surface for engaging the substrate.

15. The proximity sensor assembly of claim 10, wherein the first aperture comprises a reflective surface.

16. The proximity sensor assembly of claim 15, wherein the reflective surface is configured to direct reflected radiation from the external object towards the internal channeling section when the external object is in close proximity.

17. An electronic device having a functionality for detecting presence of an external object, the electronic device comprising:
    a substrate;
    an emitter disposed on the substrate for emitting light;

a detector disposed on the substrate for receiving light when the light is reflected from the external object;
a casing;
an optical structure extending between the substrate and the casing;
a separation wall defined by the optical structure to optically isolate the detector from the emitter such that light from the emitter is blocked from reaching the detector directly;
a top portion of the separation wall being distanced away from the casing; and
an internal channeling section located between the separation wall and the casing for directing reflected light to the detector when the external object is in close proximity.

18. The electronic device of claim 17, wherein the optical structure is configured to increasingly direct light towards the internal channeling section when the optical structure is compressed.

19. The electronic device of claim 17, wherein the optical structure further comprises a reflective surface configured to direct light reflected from the external object towards the detector through the wide portion of the internal channeling section when the external object presents in close proximity.

20. The electronic device of claim 17, wherein the close proximity comprises zero distance when the external object is in direct contact with the casing.

* * * * *